US012809852B1

(12) United States Patent
Silva

(10) Patent No.: US 12,809,852 B1
(45) Date of Patent: Nov. 24, 2026

(54) VECTOR-BASED ACTION EXECUTION USING ANGULAR COMPARISON

(71) Applicant: ADP, Inc., Roseland, NJ (US)

(72) Inventor: Allan Barcelos Silva, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 19/345,969

(22) Filed: Sep. 30, 2025

(51) Int. Cl.
*G06F 16/00* (2019.01)
*G06F 16/22* (2019.01)
*G06F 16/23* (2019.01)
*G06F 16/25* (2019.01)

(52) U.S. Cl.
CPC ...... *G06F 16/2365* (2019.01); *G06F 16/2237* (2019.01); *G06F 16/258* (2019.01)

(58) Field of Classification Search
CPC . G06F 16/2365; G06F 16/2237; G06F 16/258
USPC .......................................................... 707/687
See application file for complete search history.

(56) References Cited

U.S. PATENT DOCUMENTS 11,409,752 B1 * 8/2022 Qadrud-Din ........ G06F 16/2237 707/707
11,481,597 B2 10/2022 Hill et al.
11,797,768 B2 * 10/2023 Topol .................. G06F 16/3344 707/707
12,210,839 B1 * 1/2025 Burton ................ G06F 16/3344 707/707
2021/0374569 A1 * 12/2021 Jezewski ................ G06N 20/00 707/707
2023/0259507 A1 * 8/2023 Infante .................. G06F 16/258 707/756
2024/0232207 A9 7/2024 Bierner et al.
2024/0412720 A1 * 12/2024 Vasylyev .......... G06F 16/90332 707/707
2026/0127151 A1 * 5/2026 Goel ................... G06F 16/2237 707/707

FOREIGN PATENT DOCUMENTS

CN 118193714 B 7/2024

OTHER PUBLICATIONS

Bercaru et al. “Improving Intent Classification Using Unlabeled Data from Large Corpora”, Mathematics 2023, 11(3) 769, pp. 1-20.

* cited by examiner

*Primary Examiner* — Alexandria Y Bromell
(74) *Attorney, Agent, or Firm* — Foley & Lardner LLP

(57) ABSTRACT

Vector-based action execution using angular comparison is provided. A system can receive, from a client device, an instruction associated with an action to be executed by an application. The system can map, using a model, the instruction to a first embedding vector including dimensions. The system can reduce, using a function, the dimensions of the first embedding vector to construct a first reduced vector. The system can execute an angular comparison between the first reduced vector and predetermined reduced vectors stored in a database. Each predetermined reduced vector can correspond to a respective instruction compatible with the application. The system can select, based on the angular comparison, an action that corresponds to a predetermined reduced vector. The system can transmit one or more data packets to the application to cause the application to execute the action.

18 Claims, 7 Drawing Sheets

300

VECTOR-BASED ACTION EXECUTION USING ANGULAR COMPARISON

TECHNICAL FIELD

This application is generally related to computing technology, and, more particularly, to vector-based action execution using angular comparison.

BACKGROUND

In computing environments, processing systems can execute query routines and downstream workflows. However, queries can be inaccurate or incomplete due to variations in data formats and parameter definitions across systems, which can cause discrepancies in query execution and output reconciliation. Such inconsistencies present technical challenges in preserving data integrity, coordinating query semantics, and achieving consistent execution outcomes.

SUMMARY

Aspects of the technical solutions described in the present application address technical challenges associated with computing systems that classify intents. In particular, the technical solutions address technical challenges in preserving semantic clarity and interpretability when identifying user intent from textual data in computing systems, such as support systems, recommendation systems, or interactive computing interfaces. In this regard, a computing system may implement resource-intensive machine learning models for intent classification. For example, the machine learning models consume significant computational resources during training and inference, such as graphics processing unit (GPU) cycles, memory bandwidth, and processing capacity. Additionally, the machine learning models operate in high-dimensional embedding spaces that encode semantic features of input sequences for downstream tasks such as intent classification or query resolution. Such embedding representations reduce interpretability and increase the complexity of optimizing action selection pathways, where an action corresponds to a system-executable operation. As a result, the absence of mappings between embedding vectors and system-level actions impedes debugging, degrades explainability, and complicates the tuning of model parameters and execution logic.

Moreover, computing systems lack efficient mechanisms to resolve semantic ambiguity or isolate directional relationships between intent embeddings. Misclassification of instructions occurs when embedding representations treat lexically similar but functionally distinct instructions as equivalent due to a failure to capture subtle relational differences. For example, the instruction "generate tax report" may be incorrectly routed to an unrelated processing component when meaningful differences in intent are not adequately distinguished. In this regard, simplified modeling approaches reduce the accuracy and resolution of internal semantic representations by removing features that differentiate between distinct operational outcomes. Furthermore, in computing systems demanding real-time responsiveness, such limitations introduce processing delays caused by repeated clarification routines for addressing misclassified intents. Collectively, such technical constraints present challenges in maintaining classification accuracy, minimizing response latency, preserving contextual meaning, and supporting scalable system performance during natural language instruction processing.

The technical solutions described herein implement an efficient vector-based action execution technique using angular comparison to improve accuracy, interpretability, and scalability of intent classification in computing systems that process natural language instructions. For example, to preserve semantic meaning while maintaining efficient downstream processing, the computing system transforms a received instruction into a dense numerical embedding using an embedding model configured to encode semantic, syntactic, and contextual features. To reduce computational overhead while preserving functional distinctions, the computing system implements a dimensionality reduction technique, such as principal component analysis (PCA), to extract multiple eigenvectors from the high-dimensional embedding space. Such a projection into a lower-dimensional space reduces processing time and memory consumption while maintaining the representational integrity for intent classification. In this regard, a set of N eigenvectors is retained for processing of instructions. Such a set of N eigenvectors defining a reduced embedding space is optimized to maintain the semantic separation between lexically similar but operationally distinct instructions.

To facilitate precise intent classification within the reduced embedding space, the computing system executes angular comparison between a reduced vector of an input instruction and a set of reference reduced vectors corresponding to predefined system actions using vector algebra techniques. The angular comparisons can include computing cosine similarity scores or angular distances between the reduced vector and reference vectors using vector algebra techniques. Based on such comparison results, the computing system identifies the most appropriate executable action aligned with the input instruction. Such directional matching improves classification accuracy and reduces the likelihood of misexecution, particularly in instances involving instructions that are lexically similar but functionally distinct. For example, the computing system selects and executes the action associated with the reference vector yielding the highest cosine similarity or smallest angular offset. Additionally, accurate matching between user intent and executable actions enhances the user experience by reducing clarification requests. Collectively, by using directional geometry in reduced embedding spaces, the technical solutions described herein support efficient execution of instructions, minimize computational resource usage, and reduce latency.

An aspect of the technical solutions described herein is directed to a system of vector-based action execution using angular comparison. The system can include one or more processors coupled with memory. The one or more processors can receive, from a client device, an instruction associated with an action to be executed by an application. The one or more processors can map, using a model, the instruction to a first embedding vector comprising a plurality of dimensions. The one or more processors can reduce, using a function, the plurality of dimensions of the first embedding vector to construct a first reduced vector. The one or more processors can execute an angular comparison between the first reduced vector and a plurality of predetermined reduced vectors stored in a database. Each predetermined reduced vector can correspond to a respective instruction compatible with the application. The one or more processors can select, based on the angular comparison, an action that corresponds to a predetermined reduced vector of the plurality of predetermined reduced vectors. The one or more processors can transmit, in response to the selection, one or more data packets to the application to cause the application to execute the action.

The one or more processors can receive, from the client device, the instruction in a natural language format. The one or more processors can filter, based on a category associated with the instruction, the plurality of predetermined reduced vectors stored in the database for the angular comparison. The one or more processors can execute an artificial intelligence model configured to map the instruction to the first embedding vector. The one or more processors can execute the model trained using machine learning on instructions associated with corresponding embedding vectors. To execute the angular comparison, the one or more processors can determine an angular similarity metric between the first reduced vector and each of the plurality of predetermined reduced vectors stored in the database. The one or more processors can identify, based on the angular similarity metric, a set of predetermined reduced vectors from the plurality of predetermined reduced vectors and present, to the client device, respective actions associated with the set of predetermined reduced vectors. The one or more processors can receive, from the client device, a selection of a first action associated with one of the predetermined reduced vectors of the set of predetermined reduced vectors. The one or more processors can terminate execution of one or more second actions associated with the set of predetermined reduced vectors. The one or more second actions can be different from the first action. The one or more processors can transmit the one or more data packets associated with the first action to the application to cause the application to execute the first action.

The one or more processors can concatenate the first reduced vector with a context vector associated with the application to form a concatenated vector. The one or more processors can filter, based on comparing the concatenated vector with the plurality of predetermined reduced vectors stored in the database, to identify one or more second reduced vectors. The one or more processors can execute the angular comparison between the first reduced vector and the one or more second reduced vectors. The one or more processors can identify one or more predetermined reduced vectors from the plurality of predetermined reduced vectors satisfying a predefined threshold based on angular distance to the first reduced vector. The one or more processors can transmit, to the client device, in response to identifying that the plurality of predetermined reduced vectors fails to satisfy a predefined threshold based on angular distance to the first reduced vector, a prompt requesting a second instruction from the client device. The second instruction can be associated with a second action to be executed by the application.

The one or more processors can identify one or more predetermined reduced vectors from the plurality of predetermined reduced vectors satisfying a predefined threshold based on angular distance to the first reduced vector. The one or more processors can transmit, to the client device, a set of actions corresponding to the one or more identified predetermined reduced vectors. The one or more processors can receive, from the client device, a selection of a first action from the set of actions for execution. The one or more processors can execute the angular comparison using an arctangent function to determine directional relationships between the first reduced vector and the plurality of predetermined reduced vectors. The one or more processors can generate, using principal component analysis (PCA), one or more eigenvectors and corresponding eigenvalues based on the plurality of predetermined reduced vectors stored in the database. The plurality of dimensions of the first embedding vector can correspond to semantic features extracted from the instruction.

An aspect of the technical solutions described herein is directed to a method of vector-based action execution using angular comparison. The method can include receiving, from a client device, an instruction associated with an action to be executed by an application. The method can include mapping the instruction to a first embedding vector comprising a plurality of dimensions. The method can include reducing the plurality of dimensions of the first embedding vector to construct a first reduced vector. The method can include executing an angular comparison between the first reduced vector and a plurality of predetermined reduced vectors. Each predetermined reduced vector can correspond to a respective instruction compatible with the application. The method can include selecting, based on the angular comparison, an action that corresponds to a predetermined reduced vector of the plurality of predetermined reduced vectors. The method can include transmitting, in response to the selection, one or more data packets to the application to cause the application to execute the action.

The method can include receiving, from the client device, the instruction in a natural language format. The method can include executing an artificial intelligence model configured to map the instruction to the first embedding vector. The method can include determining an angular similarity metric between the first reduced vector and each of the plurality of predetermined reduced vectors.

An aspect of the technical solutions described herein can be directed to a non-transitory computer readable medium including one or more instructions stored thereon and executable by a processor to: receive, from a client device, an instruction associated with an action to be executed by an application; map the instruction to a first embedding vector comprising a plurality of dimensions; reduce the plurality of dimensions of the first embedding vector to construct a first reduced vector; execute an angular comparison between the first reduced vector and a plurality of predetermined reduced vectors, each predetermined reduced vector corresponding to a respective instruction compatible with the application; select, based on the angular comparison, an action that corresponds to a predetermined reduced vector of the plurality of predetermined reduced vectors; and transmit, in response to the selection, one or more data packets to the application to cause the application to execute the action.

BRIEF DESCRIPTION OF THE DRAWINGS

These and other aspects and features of the present implementations are depicted by way of example in the figures discussed herein. Present implementations can be directed to, but are not limited to, examples depicted in the figures discussed herein. Thus, this innovation is not limited to any figure or portion thereof depicted or referenced herein, or any aspect described herein with respect to any figures depicted or referenced herein.

DETAILED DESCRIPTION

Aspects of the technical solutions described herein are described with reference to the figures, which are illustrative examples of this technical solution. The figures and examples below are not meant to limit the scope of the technical solutions to the present implementations or to a single implementation. Several other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, the technical solutions and the present implementations encompass present and future known equivalents to the known components referred to herein by way of description, illustration, or example.

Figure 1:
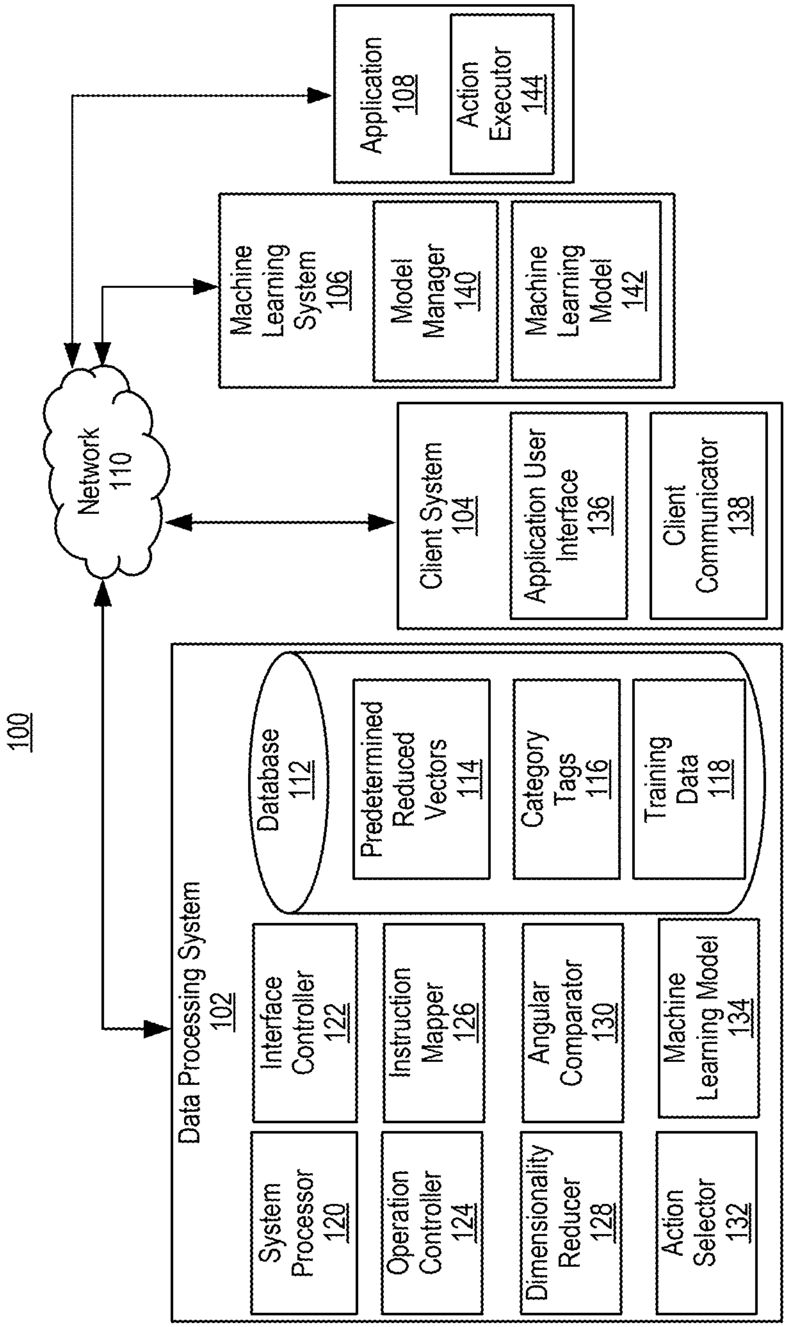
FIG. 1 depicts an example system to provide vector-based action execution using angular similarity, in accordance with some implementations.

FIG. 1 depicts an example system according to one or more aspects of the technical solutions described herein. As illustrated by way of example in FIG. 1, a system 100 can include one or more components, such as a data processing system 102, a client system 104, a machine learning system 106, and an application 108. One or more components of the system 100 can communicate via network 110.

The data processing system 102 can include computing resources configured to execute data processing operations and manage workflows. The data processing system 102 can include a physical computer system operatively coupled or couplable with one or more components of the system 100. The data processing system 102 can include, host, or be hosted by or on a cloud system, a server, a distributed remote system, or any combination thereof. The data processing system 102 can include a virtual computing system, an operating system, and a communication bus to effect communication and processing. The data processing system 102 can include physical infrastructure, such as physical servers, storage devices, and network equipment housed in data centers. The data processing system 102 can include a virtual computing system, which can include cloud-based virtual machines or containers for running applications and services. The data processing system 102 can include an operating system that can function as the core manager, allocating resources, configuring processes, and maintaining seamless interaction between hardware and applications. The data processing system 102 can include a communication bus that can facilitate communication between different components within the system. The data processing system 102 can be configured to connect with external systems to allow for data exchange and service delivery to end users.

The data processing system 102 can be, include, execute, or host a payroll system configured to manage employee compensation, deductions, tax calculations, and other payroll-related updates. The data processing system 102 can be, include, execute, or host a human resources (HR) system configured to manage employee information, including personal details, job history, performance reviews, benefits enrollment, and beneficiary designations, among others. The data processing system 102 can be or include a time and benefits administration system configured to manage employee time tracking, leave requests, vacation time, sick leave, and changes to benefits selections, among others. Such systems can represent various operational domains whose underlying data structures are subject to shape monitoring and data validation processes. The data processing system 102 can be a more generalized administrative system that incorporates functionalities from multiple domain-specific systems. The architecture and configuration of the data processing system 102 can be determined based on organizational requirements, data complexity, and the level of interoperability desired between various administrative functions.

The client system 104 (also referred to herein as a client device 104) can include a computing system that can be used to access the functionality of the data processing system 102 and the machine learning system 106. The client system 104 can include a smart phone, mobile device, laptop computer, desktop computer, one or more servers, or any other type of computing device. The client system 104 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 104 can include one or more devices to receive input from a user or to provide output to a user. For example, the output capabilities of the client system 104 can be presented through a display device that provides visual feedback to the user. The display device can enhance the user experience with electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device, but are not limited thereto.

Each client device 104 can be associated with an identifier used to identify devices or user profiles operating the client devices 104. The identifier can be of one or more forms, such as a device ID, which can be a code assigned to the client device 104 by the manufacturer or operating system, a MAC address, which can be a hardware address assigned to the client device's network interface, or an IP address, which can identify the client device 104 on a network. The identifier can be a user ID associated with the user profile operating the client device 104, or a session ID, which can be a temporary identifier assigned to a specific session. Other identifiers, such as a serial number, can be used depending on the system and device configuration. The identifiers can facilitate the management of logically partitioned data segments and client-specific configurations within a multi-tenant computing environment based on attributes such as user identity, session context, device-specific parameters, or system-defined rules.

The machine learning system 106 can include, interface with, communicate with, or otherwise utilize one or more machine learning models 142 trained on datasets. The machine learning system 106 can include a cloud system, a server, a distributed remote system, or any combination thereof. The machine learning system 106 can include, but is not limited to, at least, central processing unit (CPU), graphics processing unit (GPU), tensor processing units (TPUs), or the like. The machine learning system 106 can include a memory operable to store one or more instructions for operating components of the machine learning system 106 or operating components operably coupled to the machine learning system 106. The machine learning system 106 can be internal to the data processing system 102. The machine learning system 106 can exist external to the data processing system 102 and can be accessed via the network 110. The machine learning system 106 can implement or otherwise provide access to one or more application programming interfaces (APIs), via which the data processing system 102, the client system 104, or the application 108 can access the one or more machine learning models 142 or other functionality of the machine learning system 106.

The application 108 can be or include any system, infrastructure, service, platform, or combination of software and hardware mechanisms configured to receive, process, and execute instructions transmitted by the data processing system 102. The application 108 can include software programs, distributed systems, cloud-based services, containerized environments, or microservice architectures deployed across distributed environments. The application 108 can execute control logic, perform network operations, modify data structures, or initiate system-level routines in response to received actions or one or more data packets associated with such actions. The application 108 can interface with domain-specific components such as data processing pipelines, payroll engines, task schedulers, or natural language processing modules. The application 108 can expose APIs, function endpoints, or inter-process communication channels for integration with external components and can maintain execution state, access context, or enforcement policies. The application 108 can support synchronous or asynchronous execution modes and can support event logging, security auditing, or adaptive response based on the executed actions or the one or more associated data packets.

The network 110 can include any type or form of network. The geographical scope of the network 110 can vary widely, and the network 110 can include a body area network (BAN), a personal area network (PAN), a local-area network (LAN), e.g., Intranet, a metropolitan area network (MAN), a wide area network (WAN), or the Internet. The topology of the network 110 can be of any form and can include, e.g., any of the following: point-to-point, bus, star, ring, mesh, or tree. The network 110 can include an overlay network that is virtual and sits on top of one or more layers of other networks 110. The network 110 can be of any such network topology as known to those ordinarily skilled in the art capable of supporting the operations described herein. For example, the network 110 can be any form of computer network that can relay information among the data processing system 102, the client system 104, the machine learning system 106, and the application 108. The network 110 can utilize different techniques and layers or stacks of protocols, including, e.g., the Ethernet protocol, the Internet protocol suite (TCP or IP), the ATM (Asynchronous Transfer Mode) technique, the SONET (Synchronous Optical Networking) protocol, or the SD (Synchronous Digital Hierarchy) protocol. The TCP or IP Internet protocol suite can include the application layer, transport layer, Internet layer (including, e.g., IPv6), or the link layer. The network 110 can include a type of broadcast network, a telecommunications network, a data communication network, or a computer network.

The data processing system 102 can include, interface with, communicate with, or otherwise utilize a database 112. The database 112 can be a computer-readable memory that can store or maintain any of the information described herein. The database 112 can store data associated with the system 100. The database 112 can include one or more hardware memory devices to store binary data, digital data, or the like. The database 112 can include one or more electrical components, electronic components, programmable electronic components, reprogrammable electronic components, integrated circuits, semiconductor devices, flip flops, arithmetic units, or the like. The database 112 can include at least one of a non-volatile memory device, a solid-state memory device, a flash memory device, or a NAND memory device. The database 112 can include one or more addressable memory regions disposed on one or more physical memory arrays. A physical memory array can include a NAND gate array disposed on, for example, at least one of a particular semiconductor device, an integrated circuit device, or a printed circuit board device. In some cases, the database 112 can correspond to a non-transitory computer readable medium. In some cases, the non-transitory computer readable medium can include one or more instructions executable by a system processor 120.

The database 112 can store or maintain one or more data structures, which can include containers (such as tables, arrays, or linked lists), indices, or otherwise store each of the values, pluralities, sets, variables, vectors, numbers, or thresholds described herein. The database 112 can be accessed using one or more memory addresses, index values, or identifiers of any item, structure, or region maintained in the database 112. The database 112 can be accessed by the components of the data processing system 102, the client system 104, the machine learning system 106, or any other computing device described herein via the network 110. The database 112 can be internal to the data processing system 102. The database 112 can exist externally to the data processing system 102 and can be accessed via the network 110. The database 112 can be remote from the client system 104 or the machine learning system 106 and can be accessed over the network 110. For example, the database 112 can be distributed across many different computer systems (e.g., a cloud computing system) or storage elements and can be accessed via the network 110 or a suitable computer bus interface.

The database 112 can store or maintain predetermined reduced vectors 114. Each predetermined reduced vector 114 can correspond to an instruction compatible with the application 108. A predetermined reduced vector 114 can correspond to a lower-dimensional version of an embedding vector encoding the semantic meaning and underlying intent of a known instruction. Each predetermined reduced vector 114 can be associated with a predefined action, system command, or execution endpoint supported or executable by the application 108. The corresponding intent can define the functional purpose of the instruction (e.g., “generate payroll report,” “update employee profile,” or “retrieve timesheet summary”). The database 112 can associate each predetermined reduced vector 114 with metadata such as a category label, similarity threshold, confidence score, or contextual constraint. The predetermined reduced vectors 114 stored in the database 112 can function as reference points during angular comparison to determine which previously defined instruction or intent is most directionally similar to a received input from a client device 104. The database 112 can implement indexing structures to facilitate low-latency data retrieval and vector similarity operations.

Each predetermined reduced vector 114 can be generated through a dimensionality reduction process, for example, principal component analysis (PCA). The PCA process can compute one or more eigenvectors and corresponding eigenvalues based on the embedding vectors derived from training data or a defined corpus of compatible instructions. The eigenvectors can define the principal components that function as the axes of the reduced vector space. The predetermined reduced vectors 114 can be computed by projecting the high-dimensional embedding vectors onto a subset of selected eigenvectors. The eigenvalues can quantify the variance captured by each eigenvector, which facilitates the selection of eigenvectors that preserve the most significant semantic characteristics of the original embedding vectors. For example, an embedding vector derived from the instruction "generate payroll report" can be projected onto principal components identified through the PCA process. The PCA process can identify eigenvectors that capture variance associated with financial terminology and others that capture variance associated with unrelated domains. The eigenvalue corresponding to the financial-related eigenvector can be significantly larger to indicate higher semantic contribution. Based on eigenvalue magnitude, the data processing system 102 can discard dimensions with minimal relevance and compute a reduced vector that preserves the core semantic intent of the instruction.

The database 112 can store or maintain category tags 116. Each category tag 116 can indicate a semantic or functional classification associated with a corresponding predetermined reduced vector 114. A category tag 116 can be assigned based on contextual, operational, or domain-specific characteristics of an instruction. For example, category tags can include labels such as "payroll," "benefits," "reporting," "onboarding," or "compliance." The data processing system 102, via an instruction mapper 126 or an upstream classification component, can associate an instruction with one or more category tags 116 prior to or during the embedding and reduction process. One or more components of the data processing system 102, such as an angular comparator 130, can use category tags 116 to filter the plurality of predetermined reduced vectors 114 and limit the scope of angular comparison to such vectors associated with the same category as the input instruction. The database 112 can support indexing or partitioning by category tag 116 to support low-latency lookup, retrieval, and filtering during real-time inference. The predetermined reduced vector 114 can be associated with multiple category tags 116 to support multi-intent or cross-domain classification. For example, a predetermined reduced vector 114 specifying the instruction "submit payroll report" can be associated with "payroll" and "reporting" category tags 116.

The database 112 can store or maintain training data 118. The training data 118 can include a dataset of instructions associated with corresponding embedding vectors. Each instruction can correspond to a natural language input, and the associated embedding vector can encode semantic and contextual features in a high-dimensional vector space. The training data 118 can include instruction-embedding vector pairs generated by a pre-trained language model or embedding service. The training data 118 can be constructed through synthetic generation or extraction from historical interaction logs that record user-initiated instructions. The embedding vectors can be generated using models trained via supervised learning, unsupervised learning, or self-supervised learning algorithms, depending on the implementation of an instruction mapper 126. For example, in a supervised learning instance, an annotated training dataset can include instructions such as "generate invoice" or "schedule meeting," each labeled with action categories and mapped to target embedding vectors. In an unsupervised learning instance, unlabeled instructions such as "monthly summary" or "user login details" can be clustered based on similarity in the corresponding vector representations to identify latent structure. In a self-supervised learning instance, masked language modeling or contrastive learning can be used to train embedding models by predicting missing tokens or distinguishing between similar and dissimilar instruction pairs, such as differentiating "submit report" from "submit reimbursement."

The training data 118 can be used to train, fine-tune, or validate a machine learning model 142 configured to map instructions to embedding vectors. The training data can include relevant metadata, including confidence scores, timestamps, classification labels, user context parameters, or application-specific identifiers. The training data 118 can support multi-intent modeling by associating a single instruction with multiple semantic vectors or intent labels indicating distinct contextual interpretations. For example, the instruction "update profile" can be associated with a security-related intent (e.g., password change) in one context and with a user-experience-related intent (e.g., photo or preference update) in another, such that the machine learning model 142 can be trained to distinguish between multiple intent classes based on contextual features.

The data processing system 102 can include, interface with, communicate with, or otherwise utilize a system processor 120. The system processor 120 can execute one or more instructions associated with the data processing system 102. The system processor 120 can include an electronic processor, an integrated circuit, or the like, including one or more of digital logic, analog logic, digital sensors, analog sensors, communication buses, volatile memory, nonvolatile memory, and the like. The system processor 120 can include, but is not limited to, at least one central processing unit (CPU), graphics processing unit (GPU), physics processing unit (PPU), tensor processing unit (TPU), embedded controller (EC), or the like. The system processor 120 can include a memory operable to store or storing one or more instructions for operating components of the system processor 120 and operating components operably coupled to the system processor 120. For example, the one or more instructions can include one or more of firmware, software, hardware, operating systems, or embedded operating systems. The system processor 120 or the data processing system 102 can include one or more communication bus controllers to effect communication between the system processor 120 and the other elements of the data processing system 102.

The data processing system 102 can include, interface with, communicate with, or otherwise utilize an interface controller 122. The interface controller 122 can be or include any script, file, program, application, set of instructions, or computer-executable code that can be configured to facilitate communication among the data processing system 102, the client system 104, the machine learning system 106, and the application 108. The interface controller 122 can include hardware, software, or any combination. The interface controller 122 can facilitate communication among the data processing system 102, the client system 104, the machine learning system 106, and the application 108 via one or more communication interfaces. A communication interface can include, for example, an application programming interface ("API") compatible with a particular component of the data processing system 102, the client system 104, the machine learning system 106, or the application 108. The communication interface can provide a particular communication protocol compatible with a particular component of the data processing system 102, a particular component of the client system 104, a particular component of the machine learning system 106, or a particular component of the application 108. The interface controller 122 can be compatible with particular content objects and can be compatible with particular content delivery systems corresponding to particular content objects, structures of data, types of data, or any combination thereof. For example, the interface controller 122 can be compatible with the transmission of structured or unstructured data according to one or more metrics.

The data processing system 102 can include, interface with, communicate with, or otherwise utilize an operation controller 124. The operation controller 124 can be or include any script, file, program, application, set of instructions, or computer-executable code that can be configured to manage and execute actions or one or more data packets associated with one or more components of the data processing system 102, the client system 104, or the machine learning system 106. The operation controller 124 can define and manage workflows comprised of multiple interconnected tasks. The operation controller 124 can initiate, monitor, and control the execution of workflow steps. The operation controller 124 can implement conditional logic for dynamic workflow routing. The operation controller 124 can execute multiple tasks concurrently through parallel processing. The operation controller 124 can implement error handling and recovery mechanisms for workflow exceptions. The operation controller 124 can track workflow progress and provide status updates. For example, the operation controller 124 can include one or more interfaces to detect input at various portions of a workflow and can provide output responsive to specific portions of a workflow.

The data processing system 102 can include, interface with, communicate with, or otherwise utilize an instruction mapper 126. The instruction mapper 126 can be or include any script, file, program, application, set of instructions, or computer-executable code that can be configured to receive and map an instruction to a vector representation for downstream processing. The instruction mapper 126 can also receive and map instructions to facilitate initiation of downstream workflows, actions, data packets, or operations. Mapping instructions to a vector representation can refer to transforming the instruction, such as a natural language input, into embedding vectors that capture the corresponding semantic, syntactic, or contextual features for use by machine learning models or other processing components. The instruction mapper 126 can receive, from the client device 104, an instruction associated with an action to be executed by the application 108, where the instruction can be in a natural language format. The natural language format can include a user-generated input string that can include declarative, interrogative, or imperative expressions directed to executing a particular action or functional task. The instruction can specify a user's intent that is interpreted and mapped for execution. The instruction mapper 126 can tokenize lexical components and apply an embedding transformation to convert the resulting tokens into high-dimensional numerical representation. The instruction mapper 126 can be configured to execute, via a model manager 140, an artificial intelligence model configured to map the instruction to an embedding vector that specifies the semantic meaning of an instruction. The instruction mapper 126 can initiate an API call, use a remote procedure call, or use other communication protocols to trigger execution of the artificial intelligence model on the machine learning system 106. For example, the instruction mapper 126 can execute a model (e.g., the machine learning model 142) trained using machine learning on instructions associated with corresponding embedding vectors. The instruction mapper 126 can preprocess or normalize the instruction prior to mapping to provide structured input for the machine learning model 142.

The instruction mapper 126 can map the received instruction or execute a machine learning model to generate an embedding vector (e.g., a first embedding vector) including a plurality of dimensions. The embedding vector can include a high-dimensional numerical representation of the instruction, where each of the plurality of dimensions can encode the meaning and context of the instruction. For example, each dimension (e.g., a single numerical value within the vector) can contribute to a numerical feature corresponding to semantic features extracted from the instruction. The semantic features can include individual tokens (e.g., "generate," "my," and "payroll" from the instruction "generate my payroll"), contextual embeddings (e.g., the meaning of "generate" and "my" specifically when used together with "payroll"), syntactic indicators (e.g., "generate" as a verb and "my payroll" as an object phrase), or latent intent indicators inferred from the natural language input (e.g., the underlying intent of "initiate a payroll processing task" as derived from "generate my payroll"). The instruction mapper 126 can transform natural language input into a mathematically computable form where semantic similarities can be indicated by geometric proximity within a multi-dimensional embedding space, which can be a vector space in which tokens or phrases with similar meanings are positioned closer together based on learned contextual relationships.

The data processing system 102 can include, interface with, communicate with, or otherwise utilize a dimensionality reducer 128. The dimensionality reducer 128 can be or include any script, file, program, application, set of instructions, or computer-executable code that can be configured to reduce the dimensionality of an embedding vector mapped by the instruction mapper 126 to construct a lower-dimensional subspace (e.g., a first reduced vector). The dimensionality reducer 128 can reduce, using a function, the dimensions of the embedding vector to construct a reduced vector. The reduction function can include, for example, principal component analysis (PCA), autoencoders, or other mathematical techniques that identify dominant patterns, features, or variance directions within the high-dimensional vector space of the instruction embeddings to project the embedding vector onto a lower-dimensional subspace and construct a reduced vector (e.g., a first reduced vector) that preserves uncorrelated, discriminative components and removes statistically dependent or low-contributing dimensions. The reduced projection of instructions can support efficient routing of workflow instructions by facilitating rapid similarity computations across the reduced space.

The dimensionality reducer 128 can generate, using the PCA, one or more eigenvectors and corresponding eigenvalues derived from a dataset of high-dimensional instruction embeddings from which the stored reduced vectors 114 (e.g., predetermined reduced vectors 114) have been generated. The eigenvectors can define principal axes (e.g., semantic directions) along which the variance in the high-dimensional instruction embeddings is maximized, and the eigenvalues can quantify the contribution of each principal axis to the overall variance. A set of such eigenvectors, specifying the principal axes that contribute most significantly to the overall variance, can be selected and retained by the dimensionality reducer 128 to define the reduced embedding space for subsequent processing of instructions. The number of retained eigenvectors, N, can define the dimensionality of the reduced embedding space. To map a high-dimensional embedding vector into the reduced embedding space, the dimensionality reducer 128 can implement a projection operation that refers to the process of computing the coordinates of the high-dimensional embedding vector along the retained principal axes (e.g., the eigenvectors). For example, suppose an instruction embedding has 700 dimensions. In that case, the dimensionality reducer 128 can apply PCA to reduce the 700-dimensional embedding to a 2D or other lower-dimensional representation by identifying a smaller set of principal axes that collectively explain the majority of the variance (e.g., 90% of the total information). The dimensionality reducer 128 can project the high-dimensional embedding vector onto the lower-dimensional subspace to construct a reduced vector with N dimensions. Such reduced vectors can provide a compact projection of instructions that preserves semantic meaning while minimizing computational overhead.

The dimensionality reducer 128 can determine directional relationships (e.g., angles) between individual embedding vectors and a set of N principal eigenvectors. The dimensionality reducer 128 can implement vector algebra techniques, such as the arctangent function (e.g., arctan 2), to determine angular orientations of the embedding vectors relative to the principal axes, such that the textual input can be indicated as a distinct directional signature in the reduced vector space to preserve semantic separation with respect to the eigenvector-defined basis. Directional signatures can refer to or include a vector of angles, where each angle corresponds to an instruction embedding relative to a respective principal axis. In a two-dimensional reduced space, a directional signature [angle_1, angle_2] can indicate that an instruction aligns with a first semantic axis and a second semantic axis. For example, the instruction "generate payroll report" can correspond to a high-dimensional embedding vector. The dimensionality reducer 128 can determine angular offsets in degrees between the embedding vector and principal eigenvectors, indicating dominant semantic dimensions, such as financial-related actions and time-related actions. The dimensionality reducer 128 can generate a directional signature, such as [25 degrees, 10 degrees], based on the angular offsets. A related instruction, such as "generate monthly payroll report," can provide a different directional signature, such as [26 degrees, 35 degrees]. The angular difference along the time-related axis can indicate the additional semantic component caused by "monthly." The directional signature can preserve fine-grained semantic separation between instructions and can support intent disambiguation in downstream classification processes. The dimensionally reduced and directional projections, vectors, representations, or other forms of instructions can support parallel processing of multiple candidate instructions across different intent categories.

The dimensionality reducer 128 can concatenate the constructed reduced vector with a context vector associated with the application 108 to form a concatenated vector. For example, the dimensionality reducer 128 can append the dimensions of the reduced vector to the dimensions of the context vector. The reduced vector can specify a compact, lower-dimensional numerical encoding of the instruction's core semantic content. The context vector can indicate application-specific information, including active application features, historical interaction data, device settings, or other operational parameters. The dimensionality reducer 128 can generate a unified concatenated vector that integrates the intrinsic meaning of the instruction and the operational context to support disambiguation of commands, refinement of intent recognition, and context-aware execution of application-specific actions.

The context vector can include information such as user role, tenant identifier, current application route, active object type, locale, compliance scope, device type, and time-window indicators. To combine the context vector with the reduced instruction vector, the data processing system 102 can normalize both vectors such that the context vector and the reduced instruction vector share a compatible scale and format. The data processing system 102 can apply weighting to the combined representation to emphasize, indicate, or otherwise specify the instruction semantics or contextual information, depending on configuration. Before performing the final angular comparison, the data processing system 102 can filter candidate vectors by category tags and perform a quick pre-selection using approximate similarity checks on the combined representation. Such an approach allows the data processing system 102 to improve accuracy by incorporating operational context while maintaining efficient processing.

The data processing system 102 can include, interface with, communicate with, or otherwise utilize an angular comparator 130. The angular comparator 130 can be or include any script, file, program, application, set of instructions, or computer-executable code that can be configured to determine directional relationships between vectors in an embedding space. The angular comparator 130 can execute an angular comparison or compute one or more directional metrics, such as cosine similarity or angular distance, to quantify the alignment between a reduced vector constructed by the dimensionality reducer 128 and a set of predetermined reduced vectors 114 stored in the database 112. Each predetermined reduced vector 114 can correspond to a respective instruction compatible with the application. The angular comparator 130 can filter, based on a category associated with the received instruction or the respective instruction, depending on the implementation, the plurality of predetermined reduced vectors 114 for the angular comparison. For example, the angular comparator 130 can perform the comparison with candidate reduced vectors associated with a specific function, domain, or task type. The angular comparator 130 can implement conditional logic to select or exclude candidate vectors based on operational parameters (e.g., thresholds, category tags), computational context (e.g., system conditions, performance), or workflow-specific rules (e.g., user role, compliance, execution environment). The candidate reduced vectors can refer to a filtered subset of the predetermined reduced vectors 114 that belong to the same category as the received instruction being processed.

The angular comparator 130 can determine an angular similarity metric between the reduced vector and each of the predetermined reduced vectors 114 or the subset of candidate reduced vectors, and can execute the angular comparison based on the determined metric. The angular comparison can refer to a computation or determination of one or more directional metrics (e.g., cosine similarity, angular distance)

to quantify or determine the alignment between vectors in an embedding space, such as between a reduced vector and predetermined reduced vectors. The angular similarity metric can refer to a numerical value that specifies how closely aligned two vectors are in direction. The angular comparator 130 can compute the angular similarity metric using cosine similarity, which corresponds to a similarity-based directional metric, to quantify the directional relationship between vectors in the reduced vector space. A higher cosine value can indicate greater directional alignment and semantic similarity between the instruction specified by the reduced vector and a stored instruction. For example, if the reduced vector corresponds to an instruction such as "generate payroll report" and a predetermined reduced vector 114 corresponds to "download employee salary summary," a cosine similarity value of 0.70 or higher, for example, can indicate semantic alignment, which specifies that instructions relate to payroll operations. The angular comparator 130 can use such similarity metrics to support dynamic routing of instructions, allowing user requests to follow the relevant processing paths in real-time or near-real-time.

The angular comparator 130 can execute the angular comparison using an arctangent function, which corresponds to a distance-based directional metric, to determine directional relationships between the reduced vector and the predetermined reduced vectors 114. The arctangent function can be applied to vector components to compute an angle between vectors within a two-dimensional projection of the reduced vector space (e.g., using the arctangent of the ratio between orthogonal vector components). For example, the arctangent function (e.g., arctan 2) can compute a focused angular offset in a selected 2D subspace to provide additional resolution for distinguishing instructions that exhibit borderline or ambiguous similarity scores. The computed angle can indicate directional proximity while capturing divergence along specific semantic axes. For example, the instruction "generate payroll report" can exhibit an angular offset of 30 degrees (or a configurable value) relative to "download employee salary summary" to capture subtle directional divergence that helps disambiguate between a reporting-focused intent (generate payroll report) and a retrieval-focused intent (download employee salary summary). The angular comparator 130 can execute such calculations to route ambiguous or closely related instructions to the appropriate downstream actions.

The angular comparator 130 can filter, based on comparing a concatenated vector (e.g., a concatenated reduced vector) with the plurality of predetermined reduced vectors 114, to identify one or more second reduced vectors. The concatenated vector can correspond to a context-enriched query, including the reduced vector (specifying the instruction or the user intent) and the context vector (specifying application-specific operational conditions associated with such instructions or intents). The angular comparator 130 can evaluate the concatenated vector based on the predetermined reduced vectors 114, where each predetermined reduced vector 114 can correspond to a known instruction compatible with the application and the associated operational context. The angular comparator 130 can identify, based on the evaluation, a set of candidate reduced vectors (or one or more second reduced vectors) that are semantically and contextually relevant to the current execution environment. The angular comparator 130 can be configured to exclude semantically distant or irrelevant vectors from further comparison. The angular comparator 130 can execute an angular comparison between the reduced vector constructed by the dimensionality reducer 128 and one or more second reduced vectors to determine the most closely aligned instruction or intent.

The data processing system 102 can include, interface with, communicate with, or otherwise utilize an action selector 132. The action selector 132 can be or include any script, file, program, application, set of instructions, or computer-executable code that can be configured to select, based on the results of an angular comparison, an action associated with a predetermined reduced vector 114. The action selector 132 can use a directional metric, such as a similarity score or angular distance computed by the angular comparator 130, to identify one or more predetermined reduced vectors 114 from the stored predetermined reduced vectors 114 that satisfy a predefined threshold (e.g., a configurable value). For example, the identification can be based on whether the directional metric between the stored vector and the reduced vector from the instruction satisfies the predefined threshold, such as satisfying at least a minimum cosine similarity or a maximum angular distance. The threshold can define a range of directional similarity or distance values for identifying a predetermined reduced vector 114 stored in the database 112 as semantically relevant to the reduced vector. The action selector 132 can evaluate the directional metric computed by the angular comparator 130, such as angular similarity (e.g., cosine similarity or a similarity-based directional metric) or angular distance (e.g., an angle computed using arctangent or a distance-based directional metric), and evaluate the metric based on the configured threshold. A match or selection by the action selector 132 can occur when the angular similarity value falls within the defined threshold range or, equivalently, when the angular distance is less than a specified value. The action selector 132 can retrieve the action corresponding to the matched predetermined reduced vector 114, where the action can correspond to a system function, command, or API call compatible with the application. The action can refer to an executable operation performed by the data processing system 102, the client system 104, the machine learning system 106, or the application 108. The action selector 132 can be configured to align user intent with the most relevant executable actions. The action selector 132 can implement ranked selection when multiple predetermined reduced vectors 114 satisfy the threshold based on the highest similarity score, context relevance, or domain-specific rules. The action selector 132 can initiate execution of steps, operations, or processes associated with the selected action, such that downstream processes are triggered automatically.

The data processing system 102 can apply a configurable angular-distance threshold "0_max" (e.g., 30°) or a cosine-similarity threshold "t" (e.g., 0.75) to determine membership in the candidate set. Such thresholds can be adaptive. For example, the model manager 140 can update θ_max and t from validation telemetry to maintain a target precision or recall operating point. To avoid oscillations across sequential prompts, the action selector 132 can use hysteresis with an admit threshold (e.g., t_admit) greater than a retain threshold (e.g., t_retain), such that a candidate admitted in one turn is not prematurely dropped in the next. During such operations, the action selector 132 can monitor execution of previously admitted actions to prevent disruption of ongoing tasks due to threshold adjustments.

The action selector 132 can identify, based on the angular similarity metric or angular distance, a set of predetermined reduced vectors 114 from the predetermined reduced vectors 114. The action selector 132 can transmit, to the client device 104, a set of actions associated with the identified predetermined reduced vectors 114 stored in the database 112. The action selector 132 can present, to the client device 104, in parallel, respective actions associated with the set of predetermined reduced vectors 114. The action selector 132 can present the actions in parallel by presenting, concurrently via the application user interface 136, two or more action affordances (e.g., buttons, tiles, or menu entries) within a single response payload. The action selector 132 can cause the client system 104 to render the affordances simultaneously and capture a single user selection event. The data processing system 102 can return a batch of candidate actions in one API response, which the client application renders within the same view, optionally with confidence indicators. Concurrent presentation can refer to or include simultaneous availability of multiple action options in the user interface and does not imply any geometric parallelism of vectors in the embedding space. The action selector 132 can support concurrent actions, allowing multiple user selections or automated triggers to execute in parallel according to the application context.

The action selector 132 can receive, from the client device 104, a selection of an action (e.g., a first action) associated with one of the predetermined reduced vectors 114 of the set. The action selector 132 can terminate execution of one or more second actions associated with the set of predetermined reduced vectors, where the one or more second actions are different from the first action. In cases where termination occurs, the action selector 132 can manage errors resulting from partial execution or canceled operations to maintain consistent system state.

The action selector 132 can dispatch multiple candidate actions to the application 108 with correlated invocation identifiers (e.g., UUIDs) and cancellation tokens. Upon receiving the user's selection, the data processing system 102 can confirm the selected action and transmit cancel signals for all other in-flight actions. The action executor 144 can prevent canceled or duplicate actions from committing state changes. Cancellation can be implemented via message queues using tombstone markers, an HTTP DELETE against an invocation endpoint, or a gRPC stream cancellation, depending on the application integration. The action selector 132 can provide status updates associated with the cancellation and confirmation processes, such that the client device 104 or downstream monitoring systems can display the progress or resolution of selected actions.

The action selector 132 can receive, from the client device 104, a selection of a first action from a set of actions associated with the one or more identified predetermined reduced vectors 114 for execution. In cases where the plurality of predetermined reduced vectors 114 fails to satisfy a predefined threshold based on angular distance (e.g., the angular distance is too large) or cosine similarity (e.g., the cosine similarity is too low) to the reduced vector (or the first reduced vector) constructed by the dimensionality reducer 128, for example, the action selector 132 can transmit, to the client device 104, a prompt requesting a second instruction. The second instruction can be associated with a second action to be executed by the application. The second action can refer to an action identified based on the second instruction. The second instruction can provide additional details or a clearer intent to disambiguate the initial instruction. For example, suppose the initial instruction is "submit report," and no predetermined reduced vector sufficiently matches the intent. In that case, the client device 104 can return a second instruction, such as "submit monthly payroll report to finance department," such that the data processing system 102 can identify a more specific corresponding action.

When no candidate satisfies the threshold, the data processing system 102 can instruct the client device 104 to present a structured prompt to a user requesting one or more slots (e.g., report_type, target_population, date_range, etc.). The prompt can include example completions derived from the nearest intent categories to guide the user. The data processing system 102 can re-embed the updated instruction using the PCA basis to preserve comparability across attempts and recompute the directional metrics.

The action selector 132 can transmit, in response to the selection, one or more data packets associated with the selected action (or one or more data packets associated with the first action) to the application 108 to cause the application 108 to execute the action (or the first action). The data packets can refer to data units transmitted between components of the system 100, where each data packet can encapsulate execution-relevant content for the application 108. For example, the data packet can include an action identifier, one or more operational parameters, execution metadata, control commands, or computer-executable instructions. The data packets can be serialized in a transport format (e.g., JSON, XML, binary message, or protocol-specific frame) for communication across system interfaces. The action selector 132 can transmit the action or one or more associated data packets via an API call, function invocation, message queue, or service endpoint, depending on the architecture of the application 108. The action can be encoded using a structured data format (e.g., JSON or XML), including identifiers, parameters, or execution metadata associated with the application 108. The transmission can also include synchronous invocation over an internal bus or asynchronous dispatch through an event-driven interface. The action selector 132 can additionally provide status updates regarding execution results, such that client devices 104 or monitoring tools can track completion, errors, or ongoing execution.

The client system 104 can execute an application that communicates with the data processing system 102, the machine learning system 106, and the application 108. The application can present one or more application user interfaces 136. The application user interface 136 can provide visual and interactive elements to facilitate user interaction. Users can input information, view content, or initiate actions through the application user interface 136. The application user interface 136 can be associated with a particular client application that communicates with the data processing system 102, the machine learning system 106, or the application 108 to process user instructions. The client application can include an application executing on each client system 104, such as a web application, a server application, a resource, a desktop, or a file. The client application can include a local application (e.g., local to a client system), a hosted application, a software-as-a-service (SaaS) application, a virtual application, a mobile application, and other forms of content. The client application can include or correspond to applications provided by remote servers or third-party servers.

The client system 104 can include, interface with, communicate with, or otherwise utilize a client communicator 138. The client communicator 138 within the client system 104 can be similar to, and include any of the structure and functionality of, the interface controller 122 described in connection with the data processing system 102. For example, the client communicator 138 within the client system 104 can communicate with the data processing system 102, the machine learning system 106, or the application 108 via the network 110 using one or more communication interfaces to carry out the various operations described herein. The client communicator 138 can be compatible with particular content delivery systems corresponding to particular content objects, structures of data, types of data, or any combination thereof.

The machine learning system 106 can include, interface with, communicate with, or otherwise utilize a model manager 140. The model manager 140 can train, fine-tune, update, re-train, or otherwise maintain one or more machine learning models 142. The model manager 140 can include hardware, software, or any combination thereof. The model manager 140 can reside within the machine learning system 106, where the model manager 140 can manage and coordinate the training, fine-tuning, and updating of the machine learning models 142. The model manager 140 can operate as a remote service that interacts with the data processing system 102, the client system 104, or the machine learning system 106 via the interface controller 122. The model manager 140 can facilitate the training of machine learning models 142 on the training data 118 and can fine-tune the machine learning models 142 for specific tasks or domains. The model manager 140 can manage the deployment of machine learning models 142 in production environments and the integration of machine learning models 142 with other systems and services.

The model manager 140 can monitor the performance of deployed machine learning models 142, identify issues, and update machine learning models 142. The model manager 140 can utilize various machine learning algorithms, including supervised learning techniques, to train, fine-tune, or update one or more machine learning models 142 using labeled data or training datasets to improve the instruction-to-embedding mapping, intent classification, or semantic mapping of the machine learning models 142. The model manager 140 can implement unsupervised learning techniques, such as clustering and association rule mining, to identify patterns in unlabeled data or to generate labels for said unlabeled data. The model manager 140 can implement reinforcement learning techniques to update the machine learning models 142 based on user-provided feedback or training datasets.

The model manager 140 can train the machine learning model 142 using the training data 118, including a plurality of instruction-embedding vector pairs. Each instruction can correspond to a natural language input, and the corresponding embedding vector can encode semantic, contextual, or syntactic features. The machine learning model 142 can be configured to process input features such as tokenized text, part-of-speech tags, and dependency relations to generate an embedding vector (e.g., a representation of the input in a high-dimensional vector space). Each record in the training data 118 can be associated with metadata indicating target categories, similarity scores, or contextual usage patterns. The machine learning model 142 can be configured to learn semantic relationships between instructions and embedding vectors to support generalization to previously unseen input. The model manager 140 can apply dataset balancing techniques, such as oversampling underrepresented instruction categories or weighting loss functions by instruction frequency, to mitigate bias and improve semantic mapping performance. For example, the model manager 140 can adjust the training dataset to include more domain-specific instructions, such as financial queries, legal tasks, or user commands, to improve model generalization and embedding accuracy across varied input domains. The machine learning model 142 can be evaluated using directional metrics such as cosine similarity or angular distance to assess the alignment between predicted and target embeddings.

The machine learning system 106 can include, interface with, communicate with, or otherwise utilize various machine learning models 142. The machine learning model 142 can be deployed within the data processing system 102 (as indicated by a machine learning model 134) or externally as remote services. The machine learning model 134, residing within the data processing system 102, can be similar to, and include any of the structure and functionality of, the machine learning model 142. The machine learning models 142 can be trained with same or different types of machine learning techniques, trained with the same or different types of training data, or trained or configured to receive different types of input or provide different types of output. Example machine learning techniques can include neural networks, such as a generative adversarial network (e.g., a generator neural network and a discriminator neural network that are trained simultaneously through adversarial training), a variational autoencoder (e.g., an autoencoder neural network that learns to generate new data samples by modeling the underlying probability distribution of the data), an autoregressive model, or other types of neural networks (e.g., deep learning models, convolutional neural networks, recurrent neural networks, or transformers). Transformers can refer to or include a type of deep learning model architecture configured for natural language processing, including, for example, bidirectional encoder representations ("BERT"), generative pre-trained transformers, sentence transformers, text-to-text transformers, transformer-XL, robustly optimized BERT, or distilled BERT. Other types of machine learning techniques can include supervised learning models, unsupervised learning models, semi-supervised learning models, or reinforcement learning models. For example, a supervised machine learning technique can include a support vector machine used for instruction-to-embedding mapping, intent classification, or semantic mapping. Given a set of labeled training data, a support vector machine can identify the hyperplane that separates the data into classes with the largest possible margin (e.g., distance between the hyperplane and nearest data points from each class).

The machine learning model 142 can map a natural language instruction to an embedding vector. The machine learning model 142 can include a language embedding architecture, such as sentence transformers. The architecture can implement an encoder-based transformer configuration trained for natural language processing tasks. The model architecture can include multiple processing layers. For example, an embedding layer can convert words or tokens into numerical vectors. An attention layer can apply self-attention to assign weights to tokens based on contextual relevance. A feedforward layer can apply transformations to capture semantic patterns. The machine learning model 142 can process the instruction as a single input sequence to preserve syntactic and semantic structure. The embedding vector can correspond to a high-dimensional encoding of instruction-level intent. The embedding vector can include semantic features and relationships between tokens to support comparison with other vectors in the same embedding space. The embedding vector can include semantic features and relationships between tokens to support comparison with other vectors in the same embedding space. For example, the embedding vector for the instruction "generate payroll report" can be located near the embedding vector for "create salary summary" within the embedding space to indicate similarity in intent despite lexical variation.

The application 108 can include, interface with, communicate with, or otherwise utilize an action executor 144. The action executor 144 can be or include any script, file, program, application, set of instructions, or computer-executable code that can be configured to process and implement one or more actions received from the action selector 132. The action executor 144 can receive one or more data packets associated with the selected action, where the data packets can include a structured representation of the action, such as an action identifier, function pointer, execution token, serialized command, operational parameters, or execution metadata. Based on the received action, the action executor 144 can initiate a sequence of operations, which can include invoking an internal module, triggering a remote API, updating a data source, executing a domain-specific operation, or initiating a workflow. The execution process can be synchronous or asynchronous and can include context-aware routing, parameter substitution, permission checking, or validation logic, depending on the nature of the action and the underlying architecture of the application 108. The action executor 144 can log the execution outcome, transmit acknowledgment responses to the data processing system 102 or the client system 104, or update audit trails to maintain execution traceability. The specific implementation of the action executor 144 can vary across systems and can include integration with external services, orchestration engines, or microservice frameworks, depending on the implementation.

Figure 2:
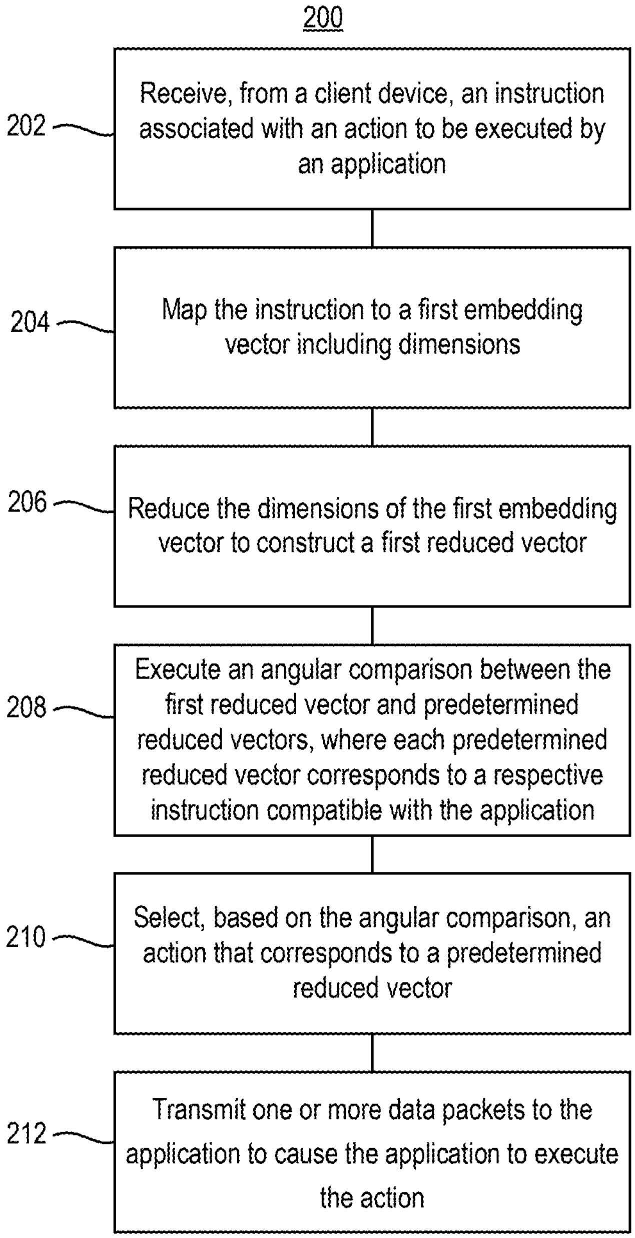
FIG. 2 depicts an example method of vector-based action execution using angular similarity, in accordance with some implementations.

FIG. 2 depicts a method 200 of vector-based action execution using angular comparison. The method 200 can be implemented using one or more systems or components depicted in FIG. 1 or FIG. 5, including, for example, data processing system 102 or computing system 500. The method 200 can include operations 202-212. The operations 202-212 can be executed in any order or sequence.

At 202, the method 200 can include receiving, from a client device, an instruction associated with an action to be executed by an application. The method can include receiving, from the client device, the instruction in a natural language format.

At 204, the method 200 can include mapping the instruction to a first embedding vector including dimensions. The method can include executing an artificial intelligence model configured to map the instruction to the first embedding vector. The method can include executing a model trained using machine learning on instructions associated with corresponding embedding vectors. The method can include mapping the instruction, using the model, to the first embedding vector, including a plurality of dimensions. The plurality of dimensions of the first embedding vector can correspond to semantic features extracted from the instruction.

At 206, the method 200 can include reducing the dimensions of the first embedding vector to construct a first reduced vector. The method can include reducing, using a function, the plurality of dimensions of the first embedding vector to construct a first reduced vector. The method can include generating, using principal component analysis (PCA), one or more eigenvectors and corresponding eigenvalues based on a plurality of predetermined reduced vectors stored in a database. The method can include concatenating the first reduced vector with a context vector associated with the application to form a concatenated vector.

At 208, the method 200 can include executing an angular comparison between the first reduced vector and predetermined reduced vectors, where each predetermined reduced vector corresponds to a respective instruction compatible with the application. The method can include filtering, based on a category associated with the instruction, the plurality of predetermined reduced vectors stored in the database for the angular comparison. To execute the angular comparison, the method can include determining an angular similarity metric between the first reduced vector and each of the plurality of predetermined reduced vectors stored in the database. The method can include executing the angular comparison using an arctangent function to determine directional relationships between the first reduced vector and the plurality of predetermined reduced vectors. The method can include filtering, based on comparing the concatenated vector with the plurality of predetermined reduced vectors stored in the database, to identify one or more second reduced vectors. The method can include executing the angular comparison between the first reduced vector and the one or more second reduced vectors.

At 210, the method 200 can include selecting, based on the angular comparison, an action that corresponds to a predetermined reduced vector. The method can include identifying one or more predetermined reduced vectors from the plurality of predetermined reduced vectors that satisfy a predefined threshold based on angular distance to the first reduced vector. The method can include transmitting, to the client device, a set of actions corresponding to the one or more identified predetermined reduced vectors. The method can include receiving, from the client device, a selection of a first action from the set of actions corresponding to the one or more identified predetermined reduced vectors for execution. The method can include identifying, based on the angular similarity metric, a set of predetermined reduced vectors from the plurality of predetermined reduced vectors. The method can include presenting, to the client device, in parallel, respective actions associated with the set of predetermined reduced vectors. The method can include receiving, from the client device, a selection of a first action associated with one of the predetermined reduced vectors of the set of predetermined reduced vectors. The method can include terminating execution of one or more second actions associated with the set of predetermined reduced vectors, where the one or more second actions are different from the first action. The method can include transmitting, to the client device, in response to identifying that the plurality of predetermined reduced vectors fails to satisfy a predefined threshold based on angular distance to the first reduced vector, a prompt requesting a second instruction from the client device. The second instruction can be associated with the action to be executed by the application. When thresholds are not satisfied, the data processing system can provide a structured prompt requesting specified slots, and the method can repeat operations 204-210 with the refined instruction.

At 212, the method 200 can include transmitting, in response to the selection of the action, one or more data packets to the application to cause the application to execute the action. The method can include transmitting the one or more data packets associated with the action or the first action to the application to cause the application to execute the action or the first action. For example, the one or more data packets can include content relevant for execution of the action, such as an action identifier, operational parameters, execution metadata, a control command, or computer-executable instructions, for execution by the application.

Figure 3:
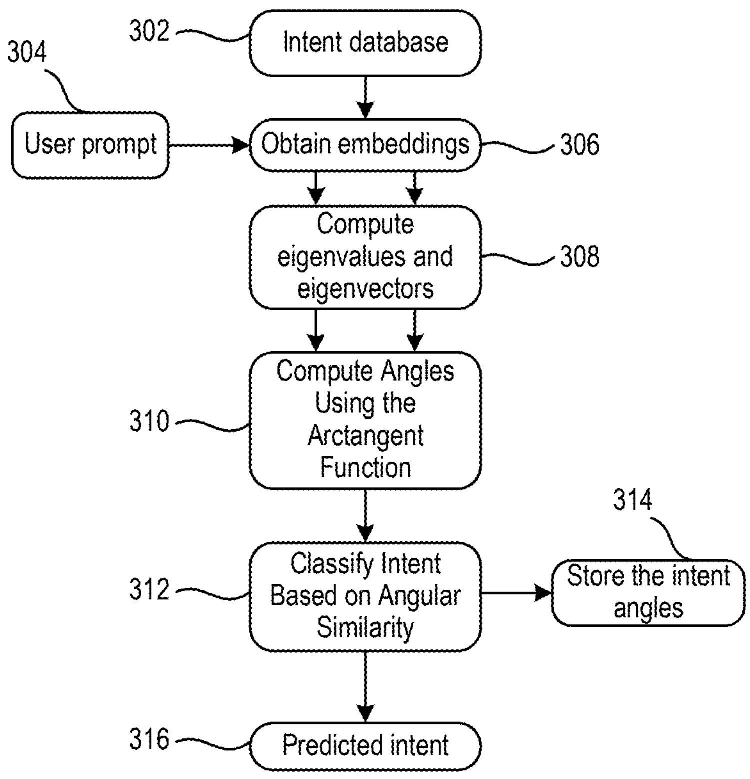
FIG. 3 depicts an example method of vector-based action execution using angular similarity, in accordance with some implementations.

FIG. 3 depicts an example method 300 of vector-based action execution using angular comparison. The method 300 can be implemented using one or more systems or components depicted in FIG. 1 or FIG. 5, including, for example, data processing system 102 or computing system 500. The method 300 can include operations 302-316. The operations 302-316 can be executed in any order or sequence.

At 302, the method 300 can include maintaining an intent database. The intent database can include text-format records describing intent categories. An intent category can correspond to a defined classification that specifies a specific goal, task, or purpose a user may have when interacting with a system. Each intent category can be associated with one or more example instructions (e.g., generating reports, searching for contacts, or creating tasks). Each intent category can be specified as a precomputed reduced vector. Each intent category can be specified as a corresponding directional signature (e.g., a vector of angular components relative to semantic axes). The intent database can store such vectors and angles in structured formats such as JSON or binary files.

At 304, the method 300 can include receiving a user prompt. The prompt can correspond to a natural language instruction or a query to be classified according to the underlying intent.

At 306, the method 300 can include obtaining an embedding vector corresponding to the user prompt. A language model or embedding model (e.g., sentence transformers) can be used to generate a high-dimensional vector representation of the input prompt that captures semantic and contextual meaning.

Figure 4A:
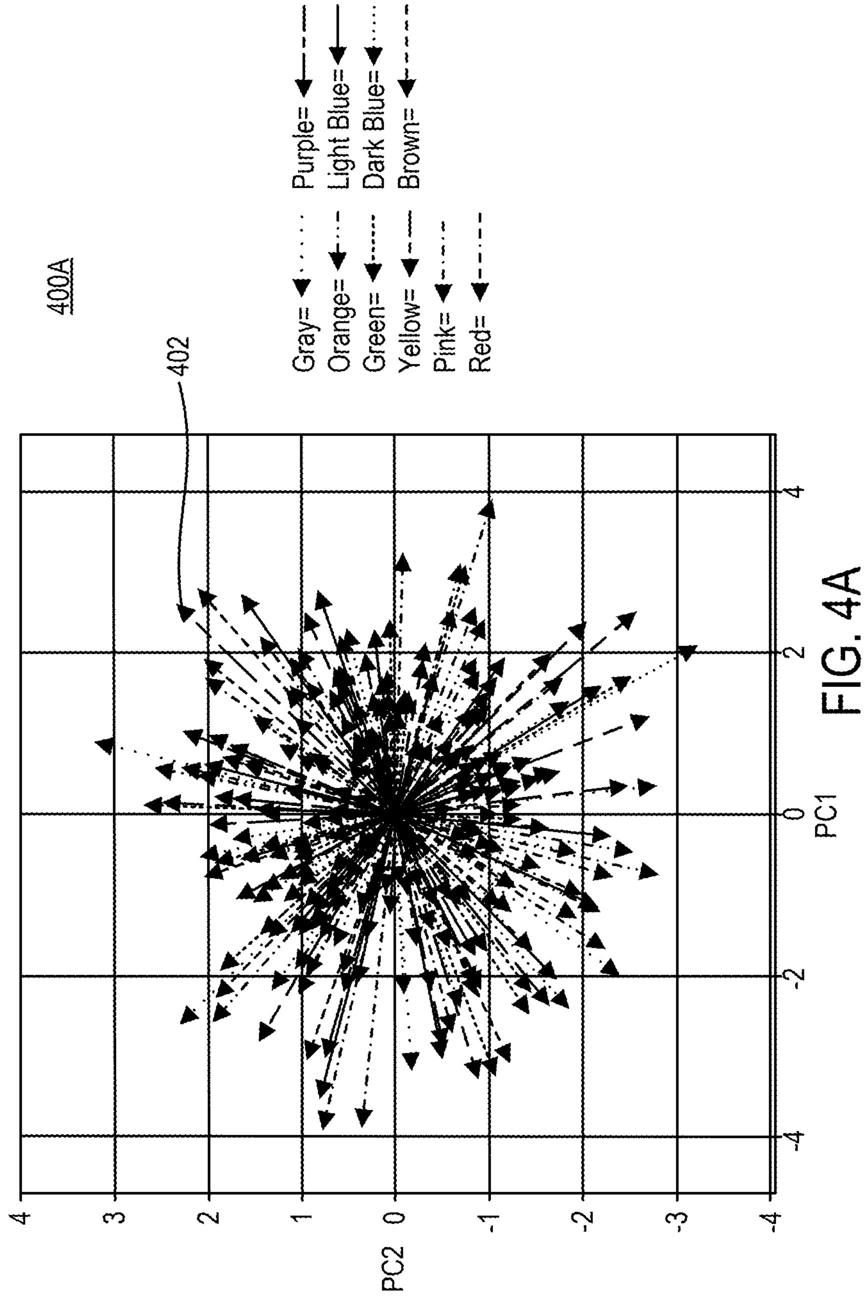
FIGS. 4A-4C depict example plots, in accordance with some implementations.

At 308, the method 300 can include computing eigenvalues and eigenvectors from the embedding space derived by known intents in the intent database. The method can include executing dimensionality reduction techniques, such as principal component analysis (PCA), to identify principal axes and construct a reduced vector space. A set of N eigenvectors can be retained to project incoming instruction embeddings into the same space. As shown in FIG. 4A, an example PCA projection plot 400A is illustrated. The plot 400A can display a set of arrows, each corresponding to a stored intent represented as a reduced vector. Each arrow can be color-coded based on the associated intent label. Each arrow (e.g., vector 402) in the plot 400A can indicate a reduced vector corresponding to an intent instruction projected into a two-dimensional space defined by the principal components PC1 and PC2. The orientation of each vector 402 in the plot 400A can indicate the semantic directionality of the instruction relative to the eigenvector basis and support angular comparison for intent classification.

At 310, the method 300 can include computing angles using the arctangent function (e.g., arctan 2). The directional orientation of the constructed reduced vector can be determined by comparing the reduced vector to the eigenvector basis, such that the arctangent function calculates angular offsets between the reduced vector and each eigenvector in a selected subspace.

Figure 4B:
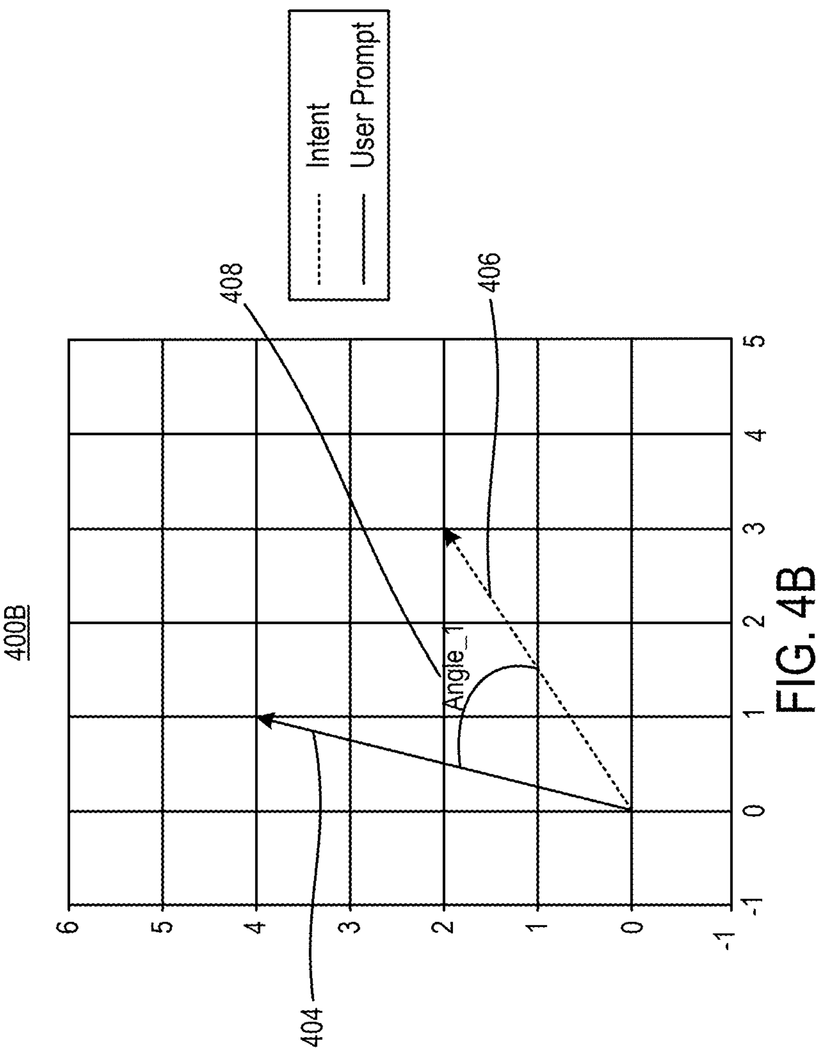

At 312, the method 300 can include classifying the intent based on angular similarity. For example, the method can include classifying the intent based on the result of an angular comparison. The method can include determining a directional metric, such as cosine similarity or angular distance, between the reduced vector and each reference reduced vector stored in the intent database. Each reference reduced vector can correspond to a stored intent. The method can include determining an angular offset between the directional orientation of the reduced vector and each precomputed directional signature of known intent categories, while accounting for the circular nature of angles (e.g., angle wrapping at 360 degrees). The method can include identifying the stored intent whose directional orientation is most closely aligned with the reduced vector based on the directional metric. As shown in FIG. 4B, an angle comparison plot 400B is illustrated. The plot 400B illustrates a prompt vector 404 corresponding to a user prompt and an intent vector 406 corresponding to a stored intent retrieved from the intent database. An angular separation, shown as Angle_1 408 (e.g., 42.3 degrees or within an example range of 30 to 50 degrees), indicates the directional difference between the prompt vector 404 and the stored intent vector 406. The angular separation (also referred to herein as an angular difference) can function as a distance-based directional metric for classifying the intent of the user prompt. For example, a smaller angular difference can indicate a higher semantic similarity, whereas a larger angular difference can indicate a greater divergence in meaning or purpose. The plot 400B can be used to visually validate how closely an incoming instruction aligns with a known intent category based on directional orientation in the reduced vector space.

At 314, the method 300 can include storing intent angles derived from a prompt or other instructions for subsequent comparisons. Each intent angle can be stored as a serialized record (e.g., in JSON format) to support real-time access and reuse during vector comparison operations.

Figure 4C:
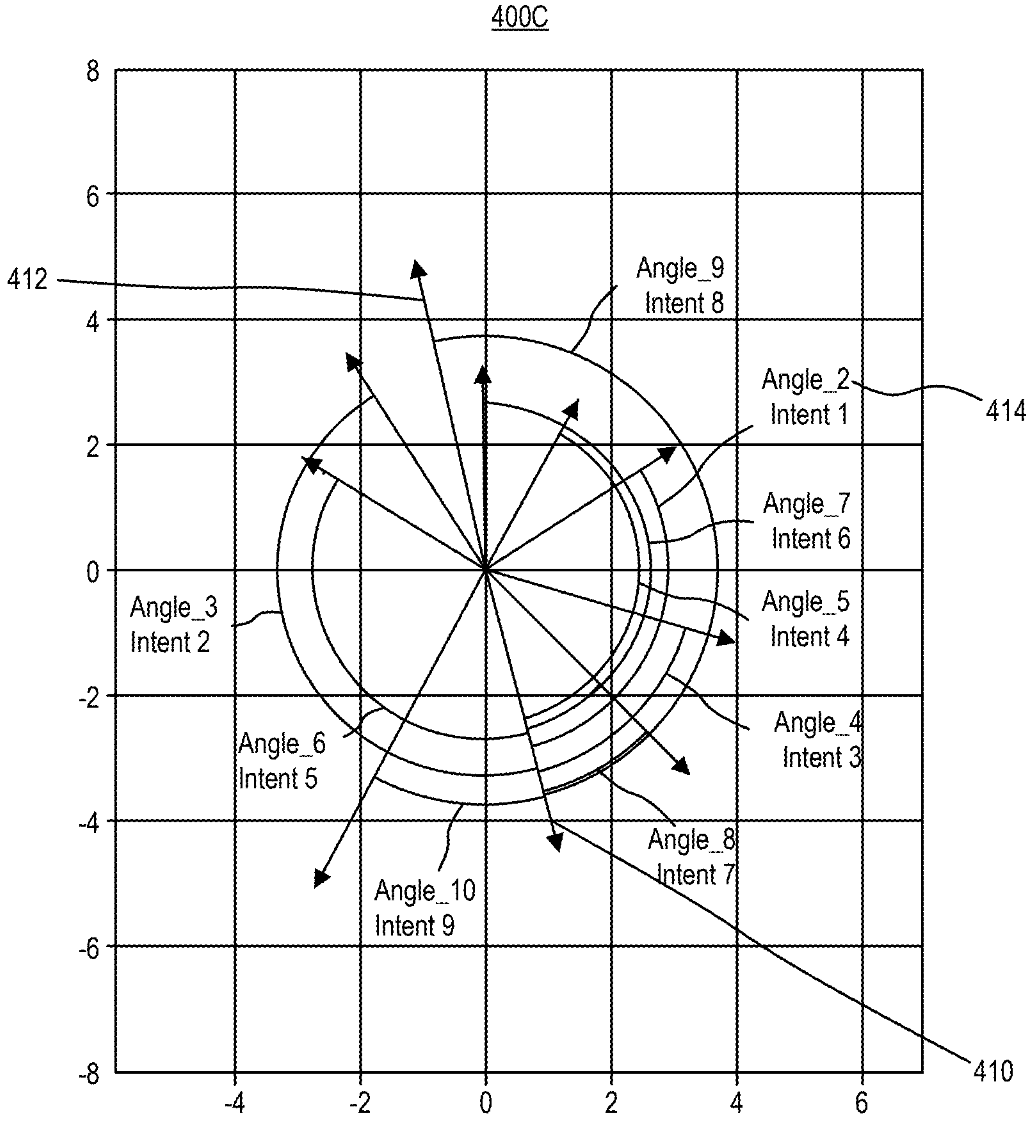

At 316, the method 300 can include predicting and outputting the matched intent as the classification result. As shown in FIG. 4C, an angle-based classification plot 400C is illustrated. A user prompt vector 410 can be computed and projected into the reduced embedding space using the same eigenvector basis (e.g., derived from PCA) used to project the stored intent vectors. A set of intent vectors 412-1 through 412-9 (e.g., intent 1-intent 9) (collectively referred to herein as an intent vector 412) can indicate precomputed directional representations of known intent categories. The method can include computing the angular distance between the user prompt vector 410 and each of the intent vectors 412. As depicted, the user prompt vector 410 forms a plurality of angles (e.g., Angle_2 through Angle_10) with different intent vectors 412. Each angle can be generally referred to herein as angle 414, and the smallest angle offset corresponds to the most semantically similar intent. For example, if a particular intent vector 412 forms the smallest angle 414 relative to the user prompt vector 410, that intent vector 412 can be selected as the predicted intent. The predicted intent can be transmitted to a downstream application to trigger an action or logged for future learning.

Figure 5:
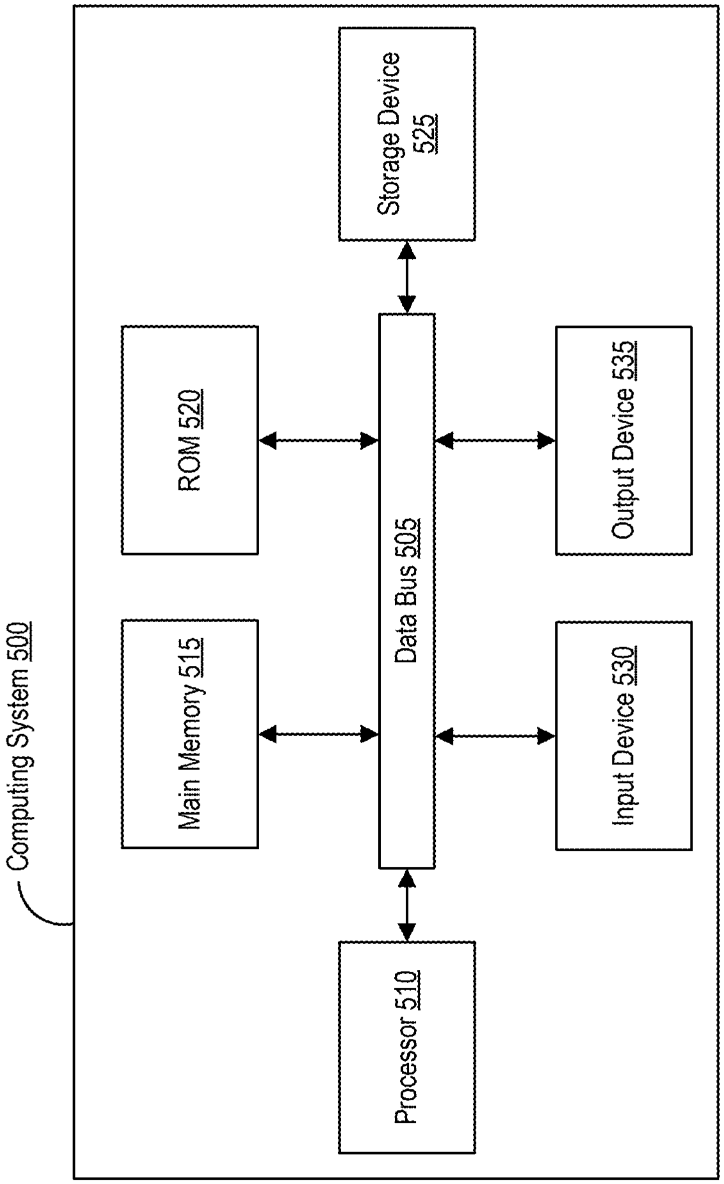
FIG. 5 depicts a block diagram of an example computing system for implementing the embodiments of the present solution, including, for example, the system depicted in FIG. 1, and the method diagrams depicted in FIGS. 2-3.

FIG. 5 depicts a block diagram of a computing system 500 for implementing the embodiments of the technical solutions discussed herein, in accordance with various aspects. FIG. 5 depicts a block diagram of an example computing system 500, which can also be referred to as the computer system 500. Computing system 500 can be used to implement elements of the systems and methods described and illustrated herein. Computing system 500 can be included in and run any device (e.g., a server, a computer, a cloud computing environment, or a data processing system).

Computing system 500 can include at least one bus data bus 505 or other communication device, structure, or component for communicating information or data. Computing system 500 can include at least one processor 510 or processing circuit coupled to the data bus 505 for executing instructions or processing data or information. Computing system 500 can include one or more processors 510 or processing circuits coupled to the data bus 505 for exchanging or processing data or information along with other computing systems 500. Computing system 500 can include one or more main memories 515, such as a random access memory (RAM), dynamic RAM (DRAM), cache memory or other dynamic storage device, which can be coupled to the data bus 505 for storing information, data and instructions to be executed by the processor(s) 510. Main memory 515 can be used for storing information (e.g., data, computer code, commands, or instructions) during execution of instructions by the processor(s) 510.

Computing system 500 can include one or more read only memories (ROMs) 520 or other static storage device 525 coupled to the bus 505 for storing static information and instructions for the processor(s) 510. Storage devices 525 can include any storage device, such as a solid-state device, magnetic disk, or optical disk, which can be coupled to the data bus 505 to persistently store information and instructions.

Computing system 500 can be coupled via the data bus 505 to one or more output devices 535, such as speakers or displays (e.g., liquid crystal display or active matrix display) for displaying or providing information to a user. Input devices 530, such as keyboards, touch screens or voice interfaces, can be coupled to the data bus 505 for communicating information and commands to the processor(s) 510. Input device 530 can include, for example, a touch screen display (e.g., output device 535). Input device 530 can include a cursor control, such as a mouse, a trackball, or cursor direction keys, for communicating direction information and command selections to the processor(s) 510 for controlling cursor movement on a display.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors 510 in a multi-processing arrangement can also be employed to execute the instructions contained in main memory 515. Hard-wired circuitry can be used in place of or in combination with software instructions, together with the systems and methods described herein. Systems and methods described herein are not limited to any specific combination of hardware circuitry and software.

Although an example computing system has been described in FIG. 5, the subject matter, including the operations described in this specification, can be implemented in other types of digital electronic circuitry, or in computer software, firmware, or hardware, including the structures described in this specification and their structural equivalents, or in combinations of one or more of them.

The foregoing examples have been provided merely for the purpose of explanation and are in no way to be construed as limiting of the present description. While aspects of the technical solutions described herein have been described with reference to an exemplary embodiment, it is understood that the words which have been used herein are words of description and illustration, rather than words of limitation. Changes can be made, within the purview of the appended claims, as presently stated and as amended, without departing from the scope and spirit of the present description in its aspects. Although aspects of the technical solutions described herein have been described herein with reference to particular means, materials and embodiments, the present description is not intended to be limited to the particulars described herein; rather, the present description extends to all functionally equivalent structures, methods and uses, such as are within the scope of the appended claims.

The subject matter and the operations described in this specification can be implemented in digital electronic circuitry, or in computer software, firmware, or hardware, including the structures described in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component" or "data processing apparatus" or the like encompass various apparatuses, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, application, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media, and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently described systems or methods, their components, acts, or elements to single or plural configurations. References to any act or element being based on any information, act or element can include implementations where the act or element is based at least in part on any information, act, or element.

Any implementation described herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations described herein.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A,' only 'B,' as well as both 'A' and 'B.' Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the described elements and operations without departing from the scope of the present description.

What is claimed is:

1. A system for vector-based action execution using angular comparison, the system comprising:

one or more processors, coupled with memory, to:

receive, from a client device, an instruction associated with an action to be executed by an application;

map, using a model, the instruction to a first embedding vector comprising a plurality of dimensions;

reduce, using a function, the plurality of dimensions of the first embedding vector to construct a first reduced vector;

determine, based on execution of an angular comparison between the first reduced vector and a plurality of predetermined reduced vectors stored in a database, an angular similarity metric between the first reduced vector and each of the plurality of predetermined reduced vectors, wherein each predetermined reduced vector corresponds to a respective instruction compatible with the application;

identify, based on the angular similarity metric, a set of predetermined reduced vectors from the plurality of predetermined reduced vectors;

present, to the client device, respective actions associated with the set of predetermined reduced vectors;

select, based on the angular comparison, an action of the respective actions that corresponds to a predetermined reduced vector of the set of predetermined reduced vectors; and transmit, in response to the selection, one or more data packets to the application to cause the application to execute the action.

2. The system of claim 1, wherein the one or more processors further:

receive, from the client device, the instruction in a natural language format.

3. The system of claim 1, wherein the one or more processors further:

filter, based on a category associated with the instruction, the plurality of predetermined reduced vectors stored in the database for the angular comparison.

4. The system of claim 1, wherein the one or more processors further:

execute an artificial intelligence model configured to map the instruction to the first embedding vector.

5. The system of claim 1, wherein the one or more processors further:

execute the model trained using machine learning on instructions associated with corresponding embedding vectors.

6. The system of claim 1, wherein the one or more processors further:

receive, from the client device, a selection of a first action associated with one of the predetermined reduced vectors of the set of predetermined reduced vectors;

terminate execution of one or more second actions associated with the set of predetermined reduced vectors, the one or more second actions being different from the first action; and transmit the one or more data packets associated with the first action to the application to cause the application to execute the first action.

7. The system of claim 1, wherein the one or more processors further:

concatenate the first reduced vector with a context vector associated with the application to form a concatenated vector;

filter, based on comparing the concatenated vector with the plurality of predetermined reduced vectors stored in the database, to identify one or more second reduced vectors; and execute the angular comparison between the first reduced vector and the one or more second reduced vectors.

8. The system of claim 1, wherein the one or more processors further:

identify one or more predetermined reduced vectors from the plurality of predetermined reduced vectors satisfying a predefined threshold based on angular distance to the first reduced vector.

9. The system of claim 1, wherein the one or more processors further:

transmit, to the client device, in response to identifying that the plurality of predetermined reduced vectors fails to satisfy a predefined threshold based on angular distance to the first reduced vector, a prompt requesting a second instruction from the client device, the second instruction associated with a second action to be executed by the application.

10. The system of claim 1, wherein the one or more processors further:

identify one or more predetermined reduced vectors from the plurality of predetermined reduced vectors satisfying a predefined threshold based on angular distance to the first reduced vector;

transmit, to the client device, a set of actions corresponding to the one or more identified predetermined reduced vectors; and receive, from the client device, a selection of a first action from the set of actions for execution.

11. The system of claim 1, wherein the one or more processors further:

execute the angular comparison using an arctangent function to determine directional relationships between the first reduced vector and the plurality of predetermined reduced vectors.

12. The system of claim 1, wherein the one or more processors further:

generate, using principal component analysis (PCA), one or more eigenvectors and corresponding eigenvalues based on the plurality of predetermined reduced vectors stored in the database.

13. The system of claim 1, wherein the plurality of dimensions of the first embedding vector correspond to semantic features extracted from the instruction.

14. A method of vector-based action execution using angular comparison, the method comprising:

receiving, by one or more processors coupled with memory, from a client device, an instruction associated with an action to be executed by an application;

mapping, by the one or more processors, the instruction to a first embedding vector comprising a plurality of dimensions;

reducing, by the one or more processors, the plurality of dimensions of the first embedding vector to construct a first reduced vector;

determining, by the one or more processors, based on executing an angular comparison between the first reduced vector and a plurality of predetermined reduced vectors stored in a database, an angular similarity metric between the first reduced vector and each of the plurality of predetermined reduced vectors, wherein each predetermined reduced vector corresponds to a respective instruction compatible with the application;

identifying, by the one or more processors, based on the angular similarity metric, a set of predetermined reduced vectors from the plurality of predetermined reduced vectors;

presenting, by the one or more processors, to the client device, respective actions associated with the set of predetermined reduced vectors;

selecting, by the one or more processors, based on the angular comparison, an action of the respective actions that corresponds to a predetermined reduced vector of the set of predetermined reduced vectors; and transmitting, by the one or more processors, in response to the selection, one or more data packets to the application to cause the application to execute the action.

15. The method of claim 14, further comprising:

receiving, from the client device, the instruction in a natural language format.

16. The method of claim 14, further comprising:

executing an artificial intelligence model configured to map the instruction to the first embedding vector.

17. The method of claim 14, further comprising:

determining an angular similarity metric between the first reduced vector and each of the plurality of predetermined reduced vectors.

18. A non-transitory computer readable medium including one or more instructions stored thereon and executable by a processor to:

receive, from a client device, an instruction associated with an action to be executed by an application;

map the instruction to a first embedding vector comprising a plurality of dimensions;

reduce the plurality of dimensions of the first embedding vector to construct a first reduced vector;

determine, based on execution of an angular comparison between the first reduced vector and a plurality of predetermined reduced vectors stored in a database, an angular similarity metric between the first reduced vector and each of the plurality of predetermined reduced vectors, wherein each predetermined reduced vector corresponds to a respective instruction compatible with the application;

identify, based on the angular similarity metric, a set of predetermined reduced vectors from the plurality of predetermined reduced vectors;

present, to the client device, respective actions associated with the set of predetermined reduced vectors;

select, based on the angular comparison, an action of the respective actions that corresponds to a predetermined reduced vector of the set of predetermined reduced vectors; and transmit, in response to the selection, one or more data packets to the application to cause the application to execute the action.

* * * * *